United States Patent [19]

McMurtry

[11] Patent Number: 4,462,162
[45] Date of Patent: Jul. 31, 1984

[54] PROBE FOR MEASURING WORKPIECES
[75] Inventor: David R. McMurtry, Gloucestershire, England
[73] Assignees: Rolls-Royce Limited, London; Renishaw Electrical Limited, Gloucestershire, both of England
[21] Appl. No.: 393,606
[22] Filed: Jun. 30, 1982
[30] Foreign Application Priority Data Jun. 30, 1981 [GB] United Kingdom ............... 8120165

[51] Int. Cl.$^3$ .............................................. G01B 7/02
[52] U.S. Cl. ................................... 33/174 L; 33/1 M; 33/172 E
[58] Field of Search ............. 33/172 E, 172 D, 169 R, 33/174 Q, 174 L, 169 C, 1 M

[56] References Cited

U.S. PATENT DOCUMENTS

| 3,945,124 | 3/1976 | Jacoby | 33/169 B |
| 4,078,314 | 3/1978 | McMurtry | 33/172 E |
| 4,136,458 | 1/1979 | Bell et al. | 33/172 E |
| 4,153,998 | 5/1979 | McMurtry | 33/172 E |
| 4,279,080 | 7/1981 | Nakaya | 33/172 E |

FOREIGN PATENT DOCUMENTS

| 2742817 | 4/1978 | Fed. Rep. of Germany | 33/174 L |
| 1573447 | 8/1980 | United Kingdom | 33/174 L |

Primary Examiner—William D. Martin, Jr.
Attorney, Agent, or Firm—Parkhurst & Oliff

[57] ABSTRACT

A probe for measuring dimensions of a workpiece in coordinate positioning apparatus, comprises a base (20), a stylus holder (21) having an axis (21A), an intermediate member (22, 30) having a fixed region (22A) connected to said base and a free region (22B) connected to said holder, said intermediate member being resilient so as to be responsive to a displacing force (FW) acting on said holder in the sense tending to tilt or axially move said holder relative to said base, and sensing means (30) connected between said free region and said base for sensing the occurence of a said displacing force.

The intermediate member is only sufficiently resilient to make possible said sensing. To cope also with the requirement of the probe over-running the sensing position there is provided a spring (25) connected in a state of partial deflection between said holder and said free end to urge the holder into engagement therewith with a spring force corresponding to said partial deflection, the holder being tiltably and axially displaceable from said engagement in opposition to said spring and being returnable to said engagement by said spring when said displacing force ceases, and wherein said spring is of lesser stiffness than said intermediate member.

8 Claims, 11 Drawing Figures

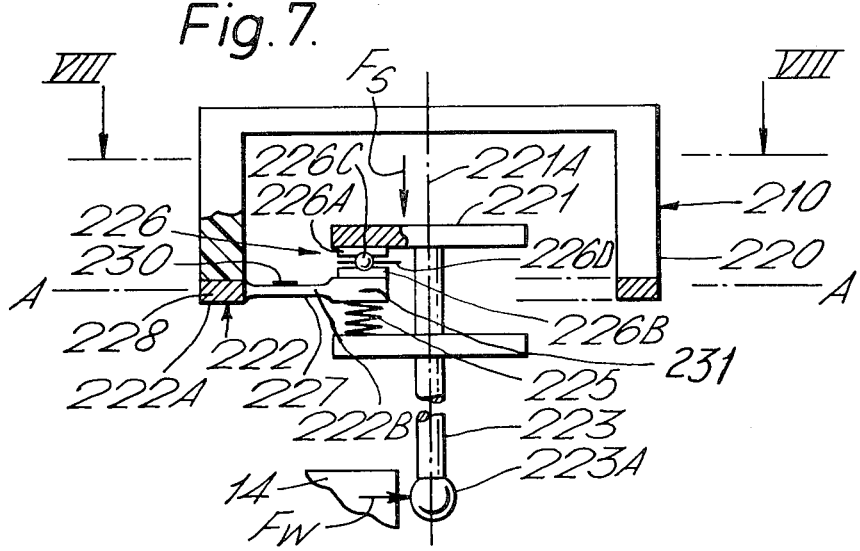
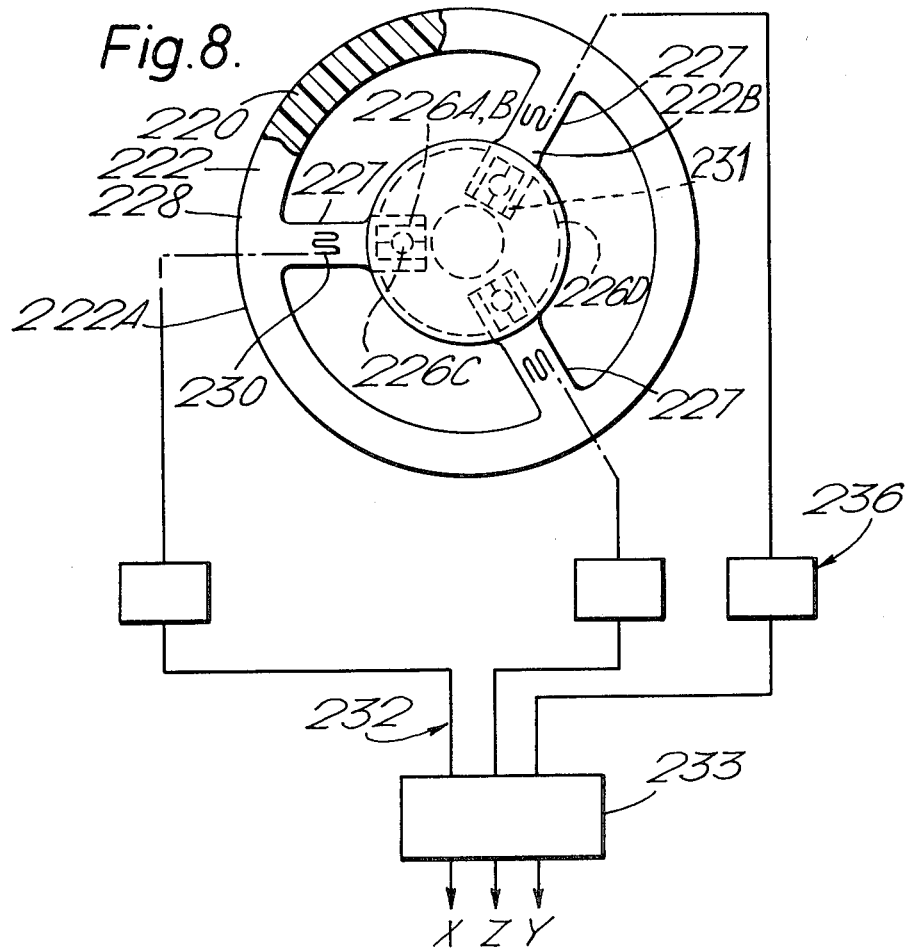

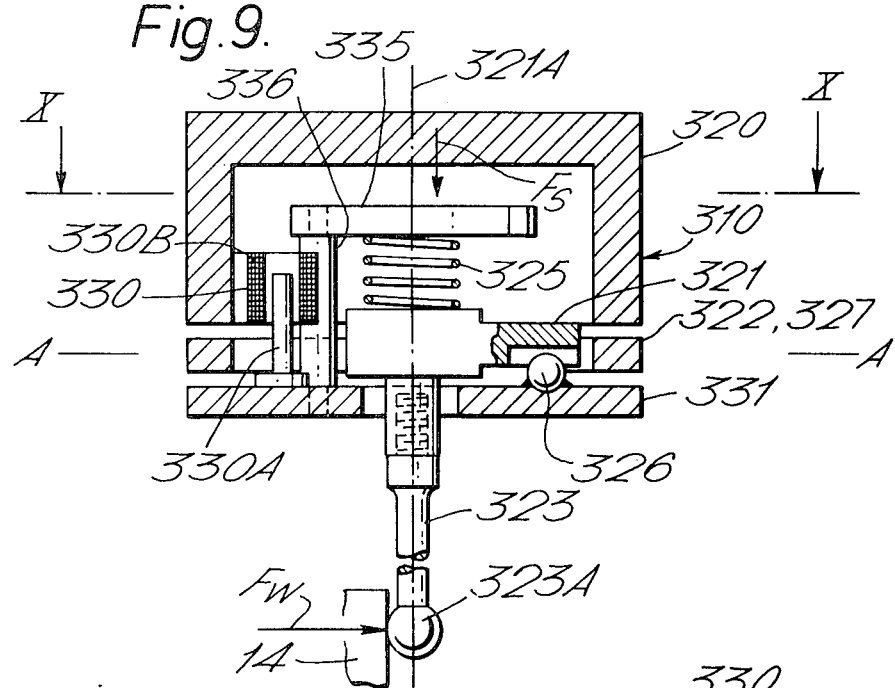
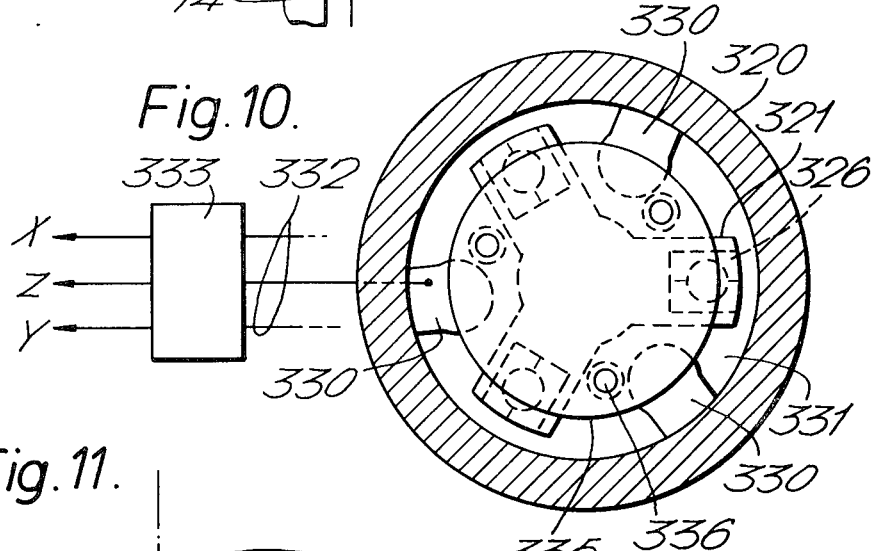
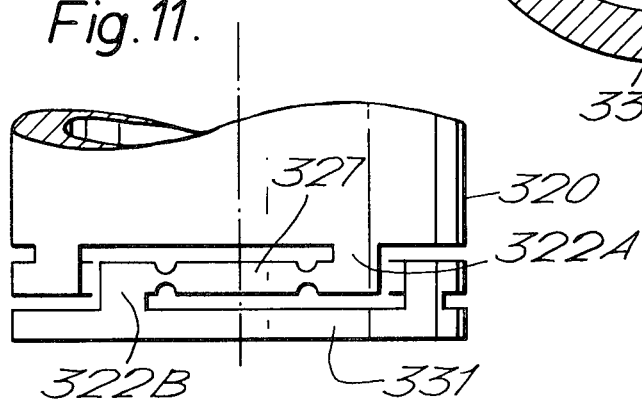

PROBE FOR MEASURING WORKPIECES

This invention relates to a probe for measuring workpieces.

British Pat. No. 1,573,447 shows a probe for measuring dimensions of a workpiece in coordinate positioning apparatus, comprising a base, a stylus holder having an axis, an intermediate member having a fixed region connected to said base and a free region connected to said holder, said intermediate member being resilient so as to be responsive to a displacing force acting on said holder in the sense tending to tilt or axially move said holder relative to said base, and sensing means connected between said free region and said base for sensing the occurrence of a said displacing force.

In the known probe said intermediate member is sufficiently flexible to accommodate relatively large excursions, e.g. 10 mm, of the holder from its initial position. Although only a small excursion, e.g. 0.1 mm, is required for the purpose of said sensing, the relatively large excursion is provided to avoid collision damage when the stylus and the workpiece are brought into engagement.

It has been found that the spring properties required for large excursions and/or the participation of the sensing means in the (large excursions) are not always compatible with properties required for sensitive sensing. It is an object of this invention to overcome or reduce this difficulty.

The invention claimed provides spring means connected in a state of partial deflection between said holder and said free end to urge the holder into engagement therewith with a spring force corresponding to said partial deflection, the holder being tiltably and axially displaceable from said engagement in opposition to said spring means and being returnable to said engagement by said spring means when said displacing force ceases, and wherein said spring means is of lesser stiffness than said intermediate member.

When a said displacing force occurs, then for so long as the displacing force is less than said pre-load, the force is accommodated entirely by said intermediate member. If the displacing force exceeds the pre-load, then, in view of the stiffness of the spring means being less than that of said intermediate member, the stylus can make a relatively large excursion accommodated substantially solely by said spring means. Accordingly, said intermediate member can be designed substantially solely with said sensing purpose in mind. In particular, relatively sensitive sensing means may be used because they are not subject to large excursions and because the spring means cushions the sensing means against the displacing force insofar as that force occurs in the form of impacts. Also, insofar as the sensing means have electrical cables connected to the base, these cables are protected insofar as they do not need to participate in the large excursions. Examples of this invention will now be described with reference to the accompanying drawings wherein:

FIG. 7 is a sectional elevation of a third example of the probe.

FIG. 8 is a section on the line VIII—VIII in FIG. 7.

FIG. 9 is a sectional elevation of a fourth example of the probe.

FIG. 10 is a section on the line X—X in FIG. 9.

FIG. 11 is an unsectioned elevation of a part of the probe shown in FIG. 9.

Figure 1:
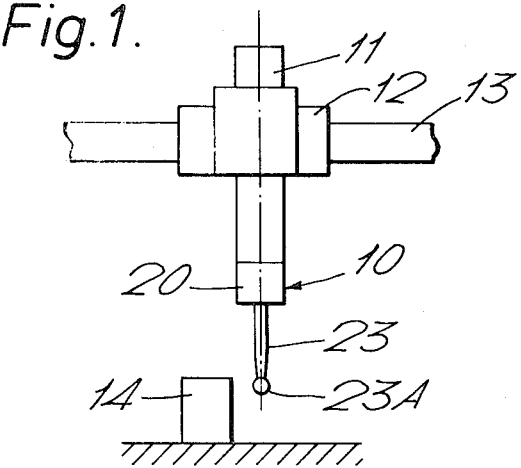
FIG. 1 is a diagrammatic elevation of a coordinate measuring machine showing a selected part only.

Referring to FIG. 1 the probe denoted 10 is intended to be supported by slides 11, 12 of a coordinate positioning apparatus 13 forming part of a measuring machine or other machine tool. The slides are movable relative to a workpiece 14 to bring the probe 10 into engagement therewith for the purpose of sensing the position of a surface of the workpiece and thereby determine the position of said surface relative to a datum.

Figure 2:
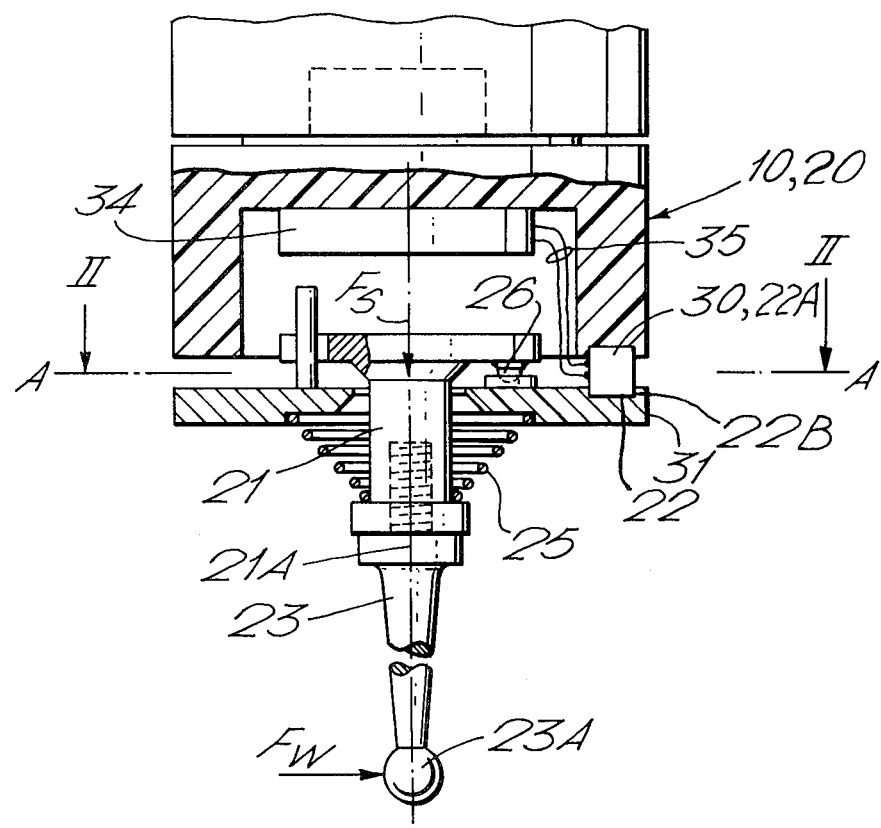
FIG. 2 is a sectional elevation of a first example of a probe according to this invention.
Figure 3:
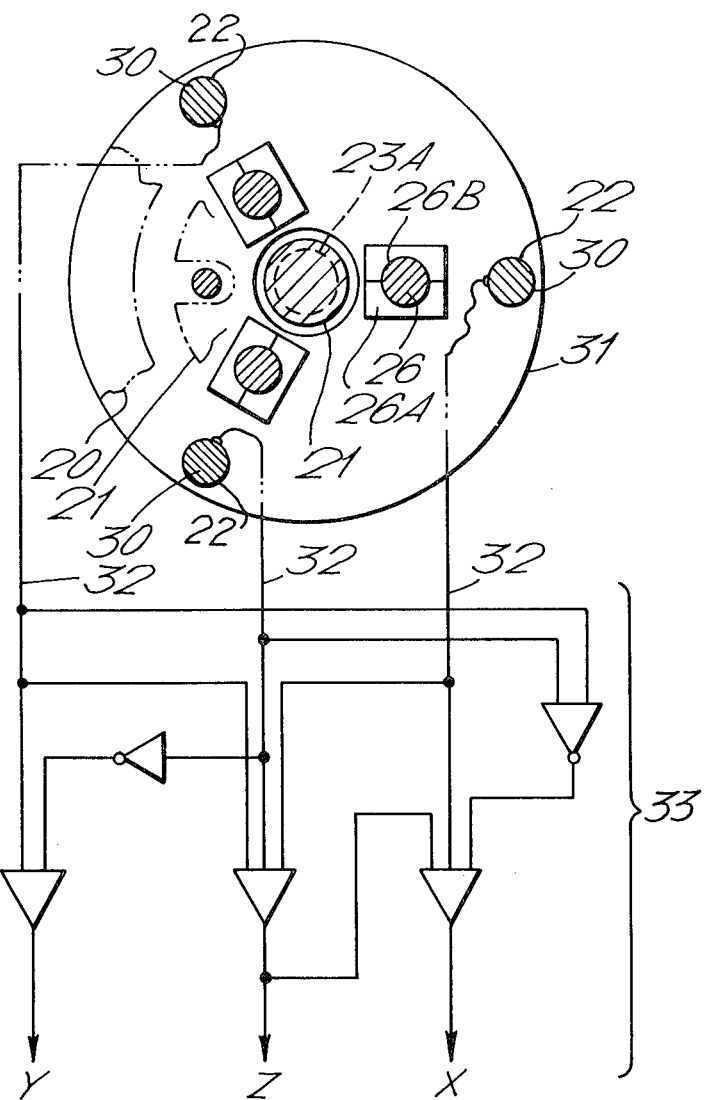
FIG. 3 is a section on the line II—II in FIG. 2.

Referring to FIGS. 2 and 3, the probe 10 has a housing or base 20, a stylus holder 21 having an axis 21A a support member 31 for the stylus holder and three intermediate members 22 each of which is connected both to the base 20 and through the intermediary of support member 31 to the stylus holder 21. The support member 31 extends substantially in a plane A—A transverse to the axis 21A. The member 22 has a fixed axially upper region 22A secured to the base 20 and a free axially lower region 22B connected to the suport member. The stylus holder 21 has secured thereto a stylus 23 having a free end 23A whereby to engage the workpiece 14. A spring 25 is connected between the holder 21 and the support member 31 in a state of pre-load, i.e. a state of partial deflection, thereby to urge the holder 21 into engagement with the support member 31 with a force Fs corresponding to said pre-load. The holder 21 is supported on the support member 31 at a kinematic support 26 comprising a seat defined by three radial V-grooves 26A (FIG. 3) secured to the support member 31 and engaged by respective spherical elements 26C secured to the holder 21. The support 26 ensures positive location of the holder 21 on the support member 31 in a rest position thereon. Sensors 30 (incorporated in the intermediate member 22) are situated between the support member 31 and the base 20 and are adapted to sense the occurrence of a force Fw acting on the free end of the stylus 23 due to engagement thereof with the workpiece 14.

In the present example the sensors 30 are three piezoelectric crystals, secured, e.g. adhered, to the support member 31 and the base 20 in position therebetween. The crystals 30 are arranged at equispaced locations about the axis 21A of the stylus and effectively connect the support member 31 at its radially outer region to the base 20 thus indirectly connecting the stylus holder 21 to the base 20. In this example the crystals form part of the intermediate member and constitute resilient structure or strain-sensitive elements capable of responding to forces tending to tilt the holder 21, or to move the holder axially, relative to the base 20. The stiffness of the crystals 30 is greater than the stiffness of the spring 25.

Figure 4:
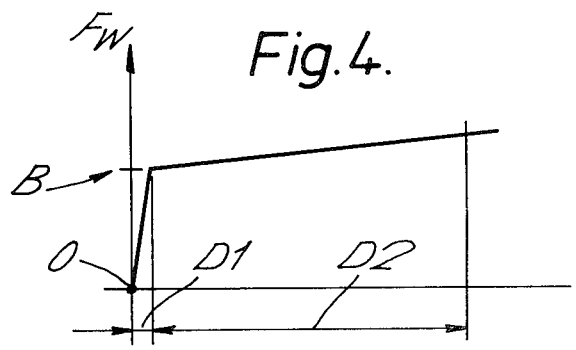
FIG. 4 is a force/deflection diagram.

Referring now also to FIG. 4, the force Fw may rise from zero to a value B at which it balances the force Fs of the spring 25. This rise of the force Fw causes a deflection D1 in the sensors 30 and produces corresponding rise from zero in output signals 32 (FIG. 3) from the respective sensors. The condition of the probe in which the force Fw lies between zero and B is referred as the "sensing condition" and any position of the probe in that condition is referred to as the "sensing position". If the force Fw exceeds the value B, so as to cause a deflection D2 of the spring 25 beyond the pre-load deflection, the probe is said to be in an "over-run condition". In the latter condition, and in view of the lesser stiffness of the spring 25 than the crystals 30, the holder 21 tilts relative to the support member 31, i.e. on the kinematic support 26, and the stylus can make an excursion which is significantly larger than its excursion during the sensing condition without a significant increase in the force Fw. In this way damage to the probe or the workpiece is avoided if, in operation, the slides 11, 12 cause the probe to over-run the sensing position. In the present example the value B of force Fw is of the order of 5 gram, the deflection D1 is less than 1 micrometer and the deflection D2 is of the order of 10 millimeter.

As shown, the force Fw has a direction transverse to the axis 21A. If the force Fw acts axially on the stylus, the sensors 30 respond correspondingly and, in the over-run condition, the holder 22 separates axially from the support member 31. In any case, when the force Fw ceases on withdrawal of the probe from the workpiece, the spring returns the support member 31 to its rest position on the kinematic support 26 and the sensors return to a zero output condition.

There are three said sensors 30 arranged in the plane A—A in equispaced relationship around the axis 21A (FIG. 3) and their outputs are connected to a circuit system 33 (known per se from British Pat. No. 1,573,447) for discriminating between forces acting on the stylus in the respective directions X, Y and Z of the coordinate system. Four or more sensors 30 may be employed, all arranged in the plane A—A and around the axis 21A. The circuit system 33 may be embodied in a casing 34 (FIG. 2) arranged within the base 20, and each sensor 30 has cables 35 (FIG. 2) connecting the sensor to the circuit system.

The arrangement illustrated provides good protection for the sensors 30 and the cables 34. Since the spring 25 is provided between the stylus and the sensors 30, the spring 25 cushions the sensors 30 against high impact forces which may act on the stylus if the probe is moved relative to the workpiece at high speeds. Further, the cables 35 undergo no significant flexing in the over-run condition of the probe.

Figure 5:
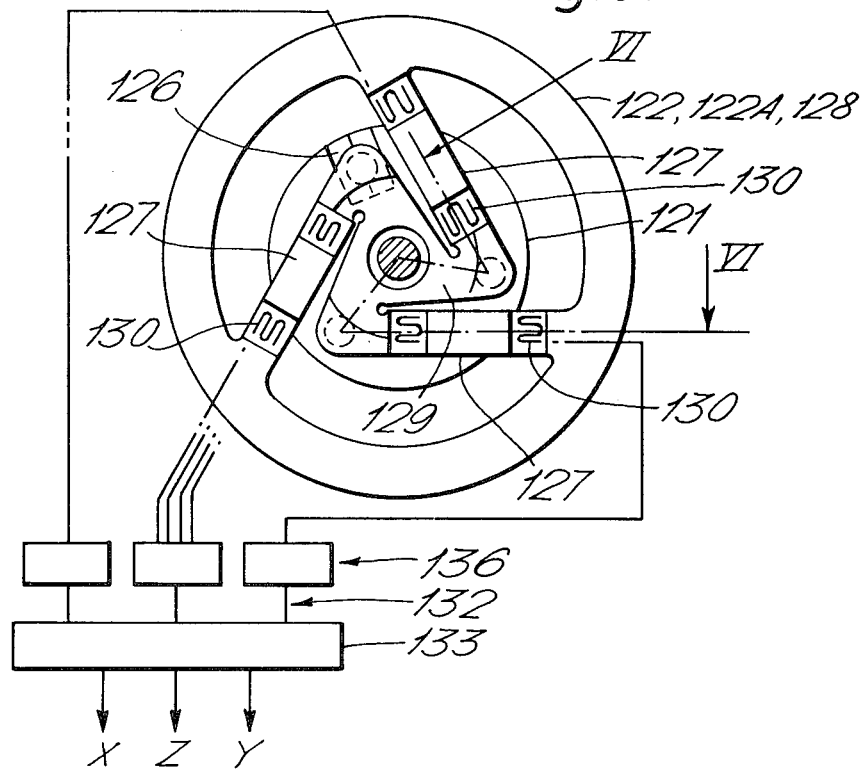
FIG. 5 is an underside view of a second example of the probe.
Figure 6:
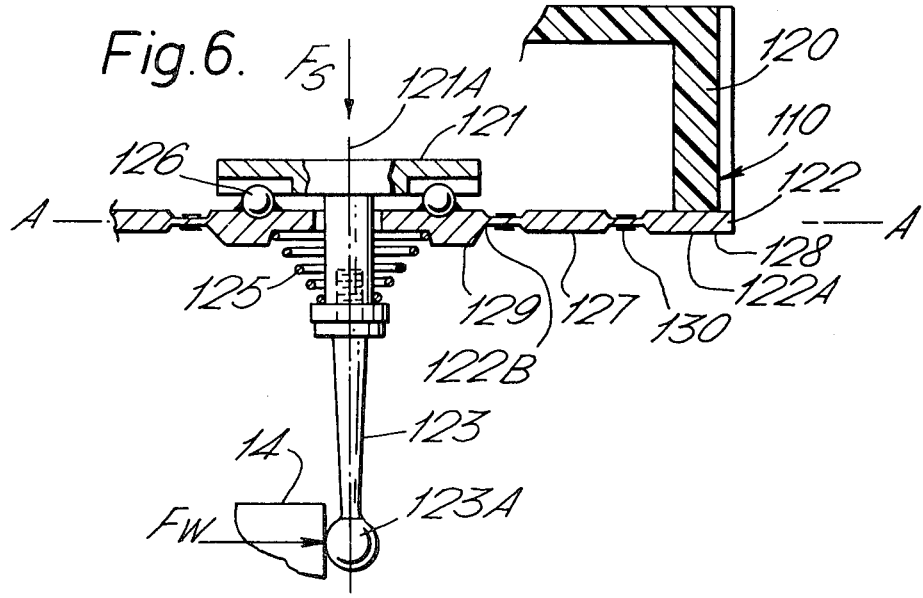
FIG. 6 is a section on the line VI—VI in FIG. 5.

Referring to FIGS. 5 and 6, a probe 110 has a housing or base 120, a stylus holder 121 having an axis 121A, and an intermediate member 122 connected to the base 120 and stylus holder 121 in position therebetween. The member 122 extends substantially in a plane A—A transverse to the axis 121A and comprises three limbs 127 extending tangentially to a circle about the axis 121A. The one ends of the limbs 127 are integral with a ring 128 secured to the base 120 and defining a fixed radially outer region 122A of the member 122. The other ends of the limbs 127 which define a free radially inner region 122B of the member 122 are integral with a centre body 129 defining a support member for the holder 121 which is supported thereon through a kinematic support 126. The holder 121 has secured thereto a stylus 123 having a free end 123A whereby to engage the workpiece 14. A spring 125 is connected between the holder 121 and the centre body 129 in a state of pre-load, i.e. a state of partial deflection, thereby to urge the holder 121 into engagement with the support 126 with a force Fs corresponding to said pre-load. The support 126 ensures positive location of the holder 121 on the centre body 129 in a rest position thereon. Sensors 130 connected between the free region 122B and the base 120 are adapted to sense the occurance of a force Fw acting on the free end of the stylus 123 when the stylus engages the workpiece 14. The limbs 127 are capable of resilient bending about their fixed ends and out of the plane A—A. The stiffness of the limbs 127 is greater than that of the spring 125.

The sensors 130 are strain gauges secured to reduced thickness portions of the limbs 127. Four strain gauges 130 are provided on each of the limbs 127 and are connected in a bridge circuit 136 (known per se) to produce a single output 132 indicative of the bending strain in the limb. The outputs of the respective circuits 136 are connected to a circuit system 133 similar to the system 33 (FIG. 3). In the sensing condition of the probe 110 the force Fw is sensed by the strain gauges 130 responding to deflection of the limbs 127 and in the over-run condition the holder 121 tilts on, or axially separates from, the centre body 129.

Referring to FIGS. 7 and 8, a probe 210 has a housing or base 220, a stylus holder 221 having an axis 221A, a support member 231 for the stylus holder and an intermediate member 222 connected to the base 220 and to the support member 231. The member 222 extends substantially in a plane A—A transverse to the axis 221A and comprises three limbs 227 extending radially in respect of the axis 221A. The one ends of the limbs 227 are integral with a ring 228 secured to the base 220 and defining a fixed radially outer region 222A of the member 222. The other ends of the limbs 227 define a free radially inner region 222B of the member 222 and are integral with the support member 231 which supports the holder 221 through a kinematic support 226. The holder 221 has secured thereto a stylus 223 having a free end 233A whereby to engage the workpiece 14. Springs 225 are connected between the holder 221 and the support member 231 in a state of pre-load, i.e. a state of partial deflection, thereby to urge the holder 221 into engagement with the member 231 with a force Fs corresponding to said pre-load. The support 26 ensures positive location of the holder 221 on the member 231 in a rest position thereon. Sensors 230 connected between the free region 222A and the base 220 are adapted to sense the occurance of a force Fw acting on the free end of the stylus 223 when the stylus engages the workpiece 14. The limbs are capable of resilient bending about their fixed ends and out of the plane A—A. The stiffness of the limbs 227 is greater than that of the spring 225.

The sensors 230 are strain gauges secured to the limbs 227. The strain gauges 230 have outputs 232 processed through a circuit system 233 in the same way as the outputs of the sensors 130 (FIG. 5). The member 222 differs from the member 122 (FIG. 5) in that the limbs 227 extend radially in respect of the axis 221A. This simplifies the construction of the member 222 but makes it virtually impracticable to unite the inner ends of the limbs 227 by a centre body such as 129 (FIG. 5) because, on application of the force Fw, the limbs 227 would then have to deflect in tension as well as in bending. To cope with this situation the support members 231 attached to the radially inner ends of the limbs 227 are left free and the very small amount of relative movement, required between the limbs 227 and the holder 221 when the limbs are deflected, is accommodated by the kinematic support 226. To this end the support 226 comprises at each member 231 two radial, mutually confronting V-grooves 226A, 226B provided respectively in the members 221, 231. A ball 226C engages both V-grooves 226A, 226B and the balls 226C at the three members 231 are connected by a cage 226D. Deflection of the limbs 227 is accommodated by the balls 226C rolling in the grooves 226, 226B. In the sensing condition of the probe 210, the force Fw is sensed by the strain gauges 230 responding to deflection of the limbs 227 and in the over-run condition the holder 221 tilts on, or axially separates from the members 231.

Referring to FIGS. 9 to 11, a probe 310 has a housing or base 320, a stylus holder 321 having an axis 321A, a support member 331 for the stylus holder and an intermediate member 322 connected to the base 320 and support member 331. The member 322 extends substantially in a plane A—A transverse to the axis 321A and comprises three limbs 327 extending annularly around the axis 321A. The one ends of the limbs 327 are integral with the base 320 and define a fixed region 322A of the member 322. The other ends of the limbs 327 are integral with the support member 331 and define a free region 322B of the member 322 connected to the holder 321. The limbs 327 are capable of resilient bending about the ends thereof at the fixed region 322A and out of the plane A—A. The holder 321 has secured thereto a stylus 323 having a free end 323A whereby to engage the workpiece 14. A spring 325 is connected between the holder 321 and the support member 331 in a state of pre-load, i.e. a state of partial deflection, thereby to urge the holder 321 into engagement with the member 331 with a force Fs corresponding to said pre-load. The engagement between the holder 321 and members 331 occurs at a kinematic support 326 which ensures positive location of the holder 321 on the member 322 in a rest position thereon. Sensors 330 connected between the free region 322B and the base 320 are adapted to sense the occurrence of a force Fw acting on the free end of the stylus 323 due to engagement thereof with the workpiece 14. The stiffness of the limbs 227 is greater than the stiffness of the spring 327.

The sensors 330 are inductive devices known per se and each comprising a core 330A movable along the axis of a coil 330B, the core being secured to the plate 331 and the coil being secured to the base 320. There are three sensors 320 equispaced about the axis 321A and each having an output 332. The coil axis of each sensor is parallel to the axis 321A. The outputs 332 are connected to a circuit system 333 the same as the system 33 (FIG. 3). In the sensing condition of the probe 310 the force Fw is sensed by the sensors 330 responding to deflection of the limbs 327 and in the over-run condition the holder 321 tilts on, or axially separates from the member 331. The inductive sensors 330 may be replaced by capacitative sensors, i.e. any reactive sensor may be provided for the purpose of the invention. On the other hand the sensors 330 may be replaced by optical devices known per se, involving e.g. reflective mirrors, to provide a signal of the movement of the member 331.

The limbs 327 are integral with the base 320 and the member 331 respectively as shown in FIG. 11. The sensors 330 are sited adjacent the free regions 322B. The spring 325 is arranged between the member 321 and a member 335 secured to the plate 331 by pillars 336.

I claim:

1. A probe for measuring dimensions of a workpiece in coordinate positioning apparatus, comprising a base, a stylus holder having an axis, a support member for supporting the stylus holder, an intermediate member having a fixed region connected to said base and a free region connected to said support member, spring means connected in a state of partial deflection between said holder and said support member to urge the holder into engagement with the support member with a spring force corresponding to said partial deflection, the holder being tiltably and axially displaceable from said engagement in opposition to said spring means and being returnable to said engagement by said spring means when said displacing force ceases, said intermediate member being resilient so as to be responsive via the support member to a displacing force acting on said holder in the sense tending to tilt said holder relative to said base, and further being responsive to a displacing force tending to axially move said holder relative to said base, and sensing means connected between said support member and said base for sensing the occurrence of said displacing forces, and wherein said spring means is of lesser stiffness than said intermediate member.

2. A probe according to claim 1 wherein said intermediate member comprises a plate-shaped part extending in a plane transverse to said axis, said plate-shaped part has a radially outer region defining said fixed region and being connected to said base at spaced apart locations thereon, and said holder is arranged to be urged by said spring means into engagement with said plate-shaped part.

3. A probe according to claim 1 wherein said intermediate member comprises elongate limbs extending transversely to and spaced from said axis of said holder, each said limb is secured at one end thereof to said base, and said intermediate member includes a centre body arranged at said axis and to which the other ends of said limbs are secured, and said holder is arranged to be urged by said spring means into engagement with said centre body.

4. A probe according to claim 1 wherein said intermediate member comprises limbs extending radially in respect of said axis and having radially outer ends secured to said base and free radially inner ends, and said holder is arranged to be urged by said spring means into engagement with said inner ends of said limbs.

5. A probe according to claim 3 wherein said limbs extend between said base and said plate-shaped part at said radially outer region thereof.

6. A probe according to claim 2 wherein said sensing means comprise strain-sensitive elements defining the connection between said plate-shaped intermediate member and said base at said spaced-apart locations.

7. A probe according to claim 3 or 4 wherein said sensing means comprises strain-sensitive elements secured to said limbs.

8. A probe according to claim 1 or 2 or 5 wherein said sensing means comprise reactive sensing means arranged between said free region and said base.

* * * * *